United States Patent [19]

Berthet

[11] 3,828,111

[45] Aug. 6, 1974

[54] ELECTRICAL CONNECTION, IN PARTICULAR, FOR CONNECTING TWO COOLED CONDUCTORS DISPOSED IN A VACUUM

[75] Inventor: Michel Berthet, Gif-sur-Yvette, France

[73] Assignee: Compagnie Generale D'Electricite, Paris, France

[22] Filed: Oct. 3, 1972

[21] Appl. No.: 281,610

[52] U.S. Cl....... 174/15 C, 174/DIG. 6, 174/117 FF

[51] Int. Cl.............................................. H01v 11/00

[58] Field of Search....... 174/DIG. 6, 15 C, 126 CP, 174/117 F, 117 FF, 15 BH; 335/216

[56] References Cited

UNITED STATES PATENTS

| | | | |
|---|---|---|---|
| 3,431,347 | 3/1969 | Kafka et al. | 174/15 C |
| 3,444,307 | 5/1969 | Kafka | 174/15 C |
| 3,522,361 | 7/1970 | Kafka | 174/15 C |
| 3,523,361 | 8/1970 | Kinter et al. | 174/DIG. 6 |

*Primary Examiner*—Arthur T. Grimley
*Attorney, Agent, or Firm*—Sughrue, Rothwell, Mion, Zion & Macpeak

[57] ABSTRACT

An electrical connection for connecting two cooled conductors disposed in a vacuum, comprising a superconductor junction placed in the vacuum, the ends of which are soldered respectively to the conductors, a stabilizing element which is a good conductor of heat and electricity at normal temperature, integral with the middle part of said junction and thermally isolated from this junction at the level of the ends and means for attaching said junction and said stabilizing element to a rigid isolating support.

13 Claims, 2 Drawing Figures

ELECTRICAL CONNECTION, IN PARTICULAR, FOR CONNECTING TWO COOLED CONDUCTORS DISPOSED IN A VACUUM

The present invention relates to electrical connections intended in particular for connecting two cooled conductors disposed in a vacuum. More particularly it relates to the electric power supply to various refrigerating devices, for example superconductor windings or cables.

The power supply of a superconductor winding which consists of a hollow conductor cooled internally by a circulating refrigerant and is disposed in a vacuum necessitates the use of a current lead-in cooled to a temperature approximating that of said refrigerant and of a connection connecting the lead-in to the conductor of the winding.

The use of a copper conductor has been considered for the connection. However, this involves certain disadvantages. In fact, in view of the extremely high current intensities which cross the connection it is necessary to choose a conductor having a large diameter which creates heat and thermal exchange between the winding and the current lead-in capable of interfering with the temperature of the winding.

The present invention is intended to avoid these disadvantages.

The object of the present invention is an electrical connection intended in particular for connecting two cooled conductors disposed in a vacuum, characterized by the fact that it comprises:

a superconductor junction, the ends of which are soldered respectively to said conductors, a stabilizing element which is a good conductor of heat and electricity, integral with the central part of said junction and thermally isolated from this junction at the level of said ends, means for attaching said junction and said stabilising element to a rigid isolating support.

Other features and advantages of the present invention will be disclosed in the course of the following description with reference to the accompanying drawing which is provided by way of illustration and is in no way limitative. In the drawing.

Figure 1:
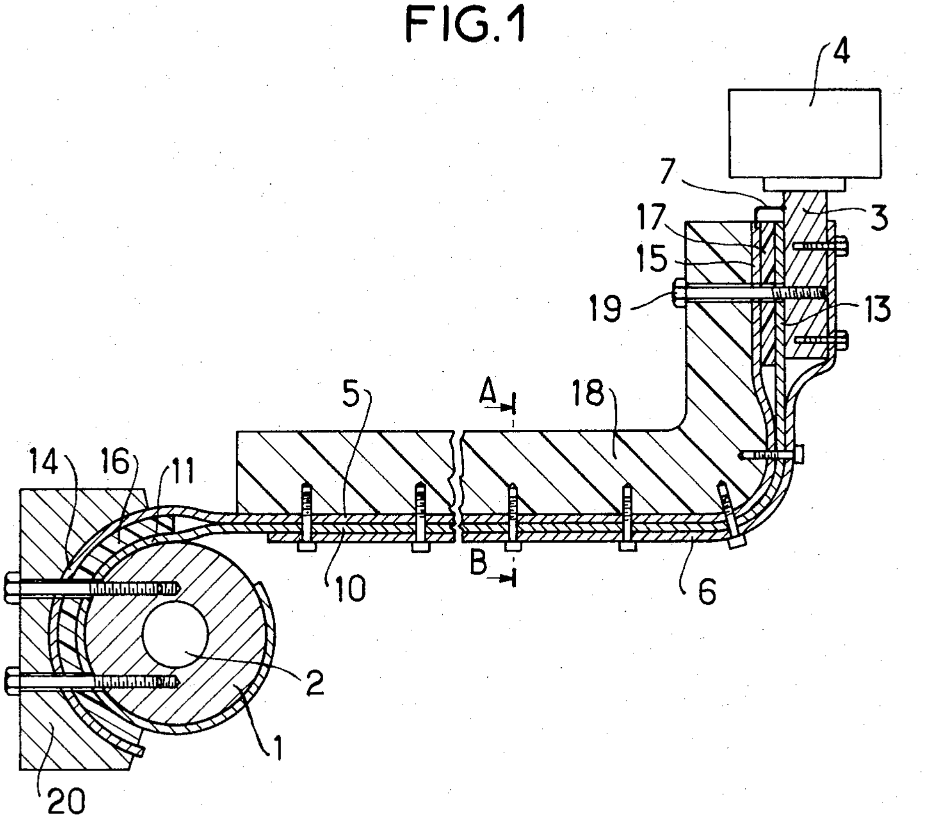
FIG. 1 is a diagrammatic view of a longitudinal section of a connection according to the invention connecting two cooled conductors.
Figure 2:
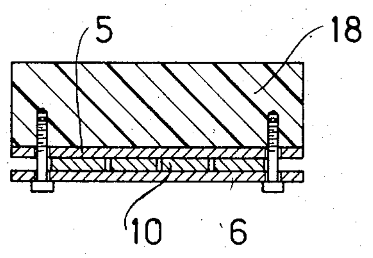
FIG. 2 is a partial cross sectional view A – B of the connection shown in FIG. 1.

Represented on FIG. 1 is an end of a conductor 1 belonging, for example, to a superconductor winding. This conductor is a hollow cylinder cooled in its centre 2 by a circulating refrigerant, for example liquid helium.

This conductor must be supplied with power by a current lead-in, the end conductor 3 of which is shown connected to its cooling device. This cooling device may be a cryostat filled with a liquid refrigerant, the temperature of which approximates that of the conductor 1.

The unit consisting of the current lead-in and the winding is in a vacuum.

The connection according to the invention connecting the two preceding elements is placed under a vacuum. It comprises a junction 10 in superconductive material, for example niobium tin. The ends of the junction are soldered to conductors 1 and 3 respectively. The junction 10 is preferably constituted by strips juxtaposed in the same plane. It may also take the form of wires or the like.

A stabilizing element made of a material which is a good conductor of heat and electricity and which may be in the form of a band 5, is soldered to the superconductor junction excepting at the level of the ends 14 and 15, i.e., in the proximity of the conductors 1 and 3. This stabilizing element may be in copper, aluminium or the like.

The ends 11 and 13 of the superconductor junction 10 are isolated from the ends 14 and 15 of the band 5 by means of the plates 16 and 17 which are made of thermally insulating material.

The stabilizing element 5 allows the calories released by the connection to be conducted and discharged at the ends 14 and 15.

According to one embodiment, a thermal bridge 7 is connected between the end 15 of the band 5 and the conductor 3. In this case the released calories are directed towards the conductor 3 and they do not interfere with the temperature of the conductor 1.

The connection according to the invention comprises a band 6 made of a material having a high mechanical resistance and applying the superconductor junction -stabilizing element unit against a rigid isolating support 18.

The band 6, which is made of inoxidable steel or the like, may be screwed onto the support 18.

In the example shown, the ends 15 and 13 are rendered integral with the conductor 3 and the support 18 by means of a fastening screw 19 and the ends 11 and 14 are rendered integral with the conductor 1 by means of an auxiliary part 20, which may, for example, be made of inoxidable steel. Any alternative fastening method may be used. Thus, mechanical ridigity at the level of the conductor 1 may be obtained by securing an end (not shown) of the band 6 on this conductor.

A mechanical structure of this nature allows the connection to resist the stresses exerted by the electrodynamic forces produced by the device.

A connection according to the invention allows a very intense current (several thousand amperes) to be transferred to the winding without affecting its temperature.

The preceding description relates to the application of a connection according to the invention to a superconductor winding but this connection may also be used with any other freezing device.

Furthermore, certain means may be replaced by equivalent means without departing from the scope of the invention.

I claim

1. An electrical connection for connecting, in particular, two cooled conductors disposed in a vacuum, said connection comprising:

a superconductor junction disposed in a vacuum and having its ends soldered respectively to said conductors, a stabilizing element which is a good conductor of heat and electricity and kept at a normal temperature integral with the middle part of said junction and thermally isolated from this junction at said ends, an electrically isolating rigid support and means attaching said junction and said stabilizing element to said support.

2. An electrical connection according to claim 1, wherein:

a plate made of thermally insulating material is interposed between the junction and the stabilizing element at each of said ends.

3. An electrical connection according to claim 1, wherein:

said superconductor junction consists of a plurality of juxtaposed superconductor strips.

4. An electrical connection according to claim 2, wherein:

said superconductor junction consists of a plurality of juxtaposed superconductor strips.

5. An electrical connection according to claim 1, wherein:

said superconductor junction consists of a plurality of superconductor wires.

6. An electrical connection according to claim 2, wherein:

said superconductor junction consists of a plurality of superconductor wires.

7. An electrical connection according to claim 1, wherein:

the stabilizing element is in the form of a band.

8. An electrical connection according to claim 1, wherein:

the fastening means comprise a band made of a material having a high mechanical resistance for applying said junction and its stabilizing element to the rigid isolating support.

9. An electrical connection according to claim 8, wherein:

the band is made of inoxidable steel.

10. An electrical connection according to claim 8, further comprising:

means including said band for coupling the ends of said junction to said conductors.

11. An electrical connection according to claim 9, further comprising:

means including said band for coupling the ends of said junction to said conductors.

12. An electrical connection according to claim 1, wherein said stabilizing element at the ends of the junction is coupled thereto by way of said interposed plates made of thermally insulating material and said junction ends are coupled to respective conductors by common coupling means.

13. An electrical connection according to claim 1, further comprising:

a thermal bridge connected between one end of said stabilizing element and one of the conductors.

* * * * *